(12) United States Patent
Kukk et al.

(10) Patent No.: US 12,119,780 B1
(45) Date of Patent: Oct. 15, 2024

(54) MOUNTING BRACKET SYSTEM FOR SOLAR PANELS AND SOLAR PANEL COMPRISING THE SAME

(71) Applicant: Roosters Unlimited OÜ, Viljandi county (EE)

(72) Inventors: Mikk Kukk, Viljandi county (EE); Raiko Kukk, Viljandi county (EE)

(73) Assignee: Roosters Unlimited OÜ, Viljandi county (EE)

( * ) Notice: Subject to any disclaimer, the term of this patent is extended or adjusted under 35 U.S.C. 154(b) by 0 days.

(21) Appl. No.: 18/640,065

(22) Filed: Apr. 19, 2024

(51) Int. Cl.
*H02S 20/23* (2014.01)
*F16B 5/06* (2006.01)

(52) U.S. Cl.
CPC ............ *H02S 20/23* (2014.12); *F16B 5/0607* (2013.01)

(58) Field of Classification Search
None
See application file for complete search history.

(56) References Cited

U.S. PATENT DOCUMENTS

| | | | | |
|---|---|---|---|---|
| 2010/0212661 A1* | 8/2010 | Schwarze | ............... | F24S 25/60 126/705 |
| 2011/0302857 A1* | 12/2011 | McClellan | ............... | F24S 40/44 52/173.3 |

* cited by examiner

*Primary Examiner* — Eli S Mekhlin
(74) *Attorney, Agent, or Firm* — Ziegler IP Law Group LLC.

(57) ABSTRACT

A mounting bracket system for solar panels, includes a sealing profile configured to be attached to side of solar panel, wherein a cross-section of the sealing profile includes a sealing profile base having first end and second end, upper part having third end and fourth end, and first dividing wall having first side and second side; and fixing profile arranged to accommodate corner of solar panel, wherein the cross-section of the fixing profile includes a U-shaped upper part having bottom part, first arm and second arm, reinforcement wall connected to second arm, second dividing wall connected to second arm, and fixing profile base having fifth end and sixth end, wherein gap is formed between reinforcement wall, second dividing wall and fixing profile base.

19 Claims, 6 Drawing Sheets

MOUNTING BRACKET SYSTEM FOR SOLAR PANELS AND SOLAR PANEL COMPRISING THE SAME

TECHNICAL FIELD

The present disclosure relates to mounting bracket systems for solar panels. Moreover, the present disclosure relates to solar panels comprising mounting bracket systems. Furthermore, the present disclosure relates to use of the solar panels together with the mounting bracket systems.

BACKGROUND

Generally, transition towards renewable energy resources, such as solar power, has become crucial in the global pursuit of sustainable and environmental friendly energy solutions. However, technical challenges such as integration of solar panels into existing building structures particularly roofs, is hindering the widespread adoption of solar energy. Traditional solar panel installation methods often require extensive modifications to the roof structure, including addition of mounting brackets, clamps and other fastening mechanisms. The traditional solar panel installation methods increase the complexity and also adds to the overall cost and material requirements for the roofing construction.

Existing solutions for integration of the solar panels into the roofs typically rely on use of clamps and mounting brackets, which can be cumbersome and aesthetically unappealing. The existing solar panel solutions are secured in place solely by small connection points, which may not provide adequate security against strong winds and heavy snow loads. Moreover, the traditional solar panels installation methods follow a sequential process, where the roof is first constructed, followed by the installation of a separate mounting framework and finally attachment of the solar panels. The sequential approach adds to the time and labour involved in the installation process which further increases cost and complexity. Moreover, the traditional solar panels installation methods do not fully integrate the solar panel into the roofing structure, resulting in less cohesive solution for the installation.

Therefore, in light of the foregoing discussion, there exists a need to overcome the aforementioned drawbacks.

SUMMARY

The aim of the present disclosure is to provide a mounting bracket system for solar panels, a solar panel comprising the mounting bracket system and use of the solar panel together with the mounting bracket system to simplify installation of the solar panels and reduce cost and material required for installation of the solar panels. The aim of the present disclosure is achieved by a mounting bracket system for solar panels and a solar panel comprising the mounting bracket system. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
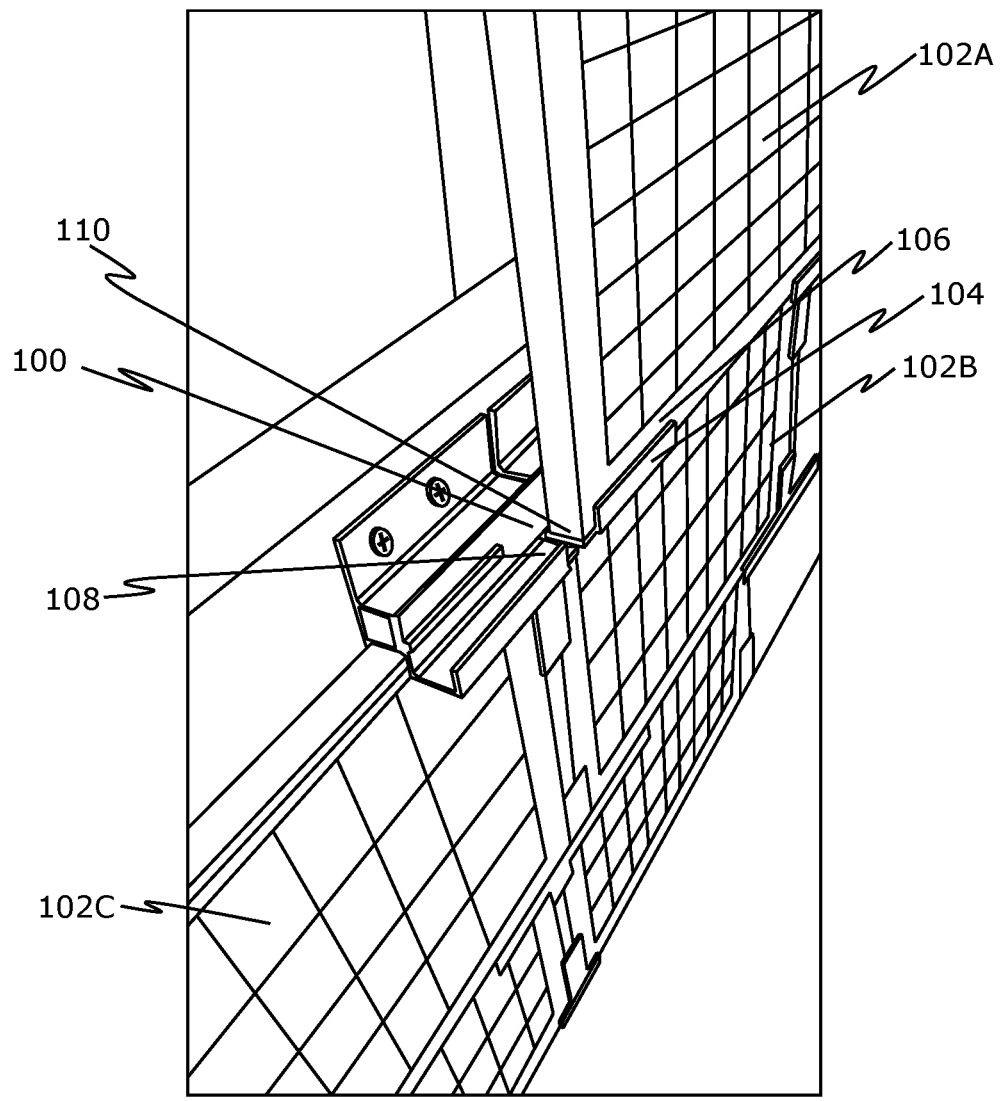
FIGS. 1A and 1B collectively are schematic illustrations of a top view and a side view of a mounting bracket system for solar panels, respectively, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides a mounting bracket system comprising:
  a sealing profile configured to be attached to a side of a solar panel, wherein a cross-section of the sealing profile comprising:
    a sealing profile base having a first end and a second end,
    an upper part having a third end and a fourth end, the upper part arranged at a first distance from the sealing profile base, and
    a first dividing wall having a first side and a second side, the first dividing wall connected to the sealing profile base between the first end and the second end at a first angle, and the first dividing wall connected to the upper part between the third end and the fourth end at a second angle; and
  a fixing profile arrange to accommodate a corner of the solar panel, wherein a cross-section of the fixing profile comprising:
    a U-shaped upper part having a bottom part, a first arm and a second arm at a second distance from the first arm,
    a reinforcement wall connected to the second arm at a third angle,
    a second dividing wall connected to the second arm at a fourth angle, and
    a fixing profile base having a fifth end and a sixth end, the fixing profile base being connected to the reinforcement wall at a fifth angle, and the fixing profile base being connected to the second dividing wall at a sixth angle, wherein a gap is formed between the reinforcement wall, the second dividing wall and the fixing profile base, and wherein the fixing profile base is at a third distance from the second arm.

The present disclosure provides an aforementioned mounting bracket system that securely attach the solar panels to a surface. The mounting bracket system reduces the need for separate roofing materials, thus minimizing material usage and waste, which lowers the overall cost of installation of solar panels. Moreover, the sealing profile and the fixing profile provides a comprehensive solution for weatherproofing, structural support and the solar panel attachment. The fixing profile attaches the solar panels to the surface and evenly distributes the weight of the solar panels to the roof structure. The integration of weatherproofing, mounting, and structural support components into the specialized profiles (i.e., the sealing profile, and the fixing profile) simplifies the installation procedure, saving time and effort. Furthermore, the fixing profile securely holds the solar panels in place to prevent movement of the solar panels and ensure structural stability.

In a second aspect, the present disclosure provides a solar panel comprising the mounting bracket system of the first aspect.

The present disclosure provides an aforementioned solar panel that securely attaches to a surface. The solar panel is independent of the need for separate roofing materials, thus minimizing material usage and waste, which lowers the overall cost of installation of solar panels. Moreover, the sealing profile and the fixing profile provides a comprehensive solution for weatherproofing, structural support and the solar panel attachment. The fixing profile attaches the solar panels to the surface and evenly distributes the weight of the solar panels to the roof structure. The integration of weatherproofing, mounting, and structural support components into the specialized profiles (i.e., the sealing profile, and the fixing profile) simplifies the installation procedure, saving time and effort.

In a third aspect, the present disclosure provides the solar panel of the second aspect together with the mounting bracket system of the first aspect to form a surface.

The present disclosure provides an aforementioned use of the solar panel together with the mounting bracket system that securely attaches to a surface. The solar panel is independent of the need for separate roofing materials, thus minimizing material usage and waste, which lowers the overall cost of installation of solar panels. Moreover, the sealing profile and the fixing profile provides a comprehensive solution for weatherproofing, structural support and the solar panel attachment. The fixing profile attaches the solar panels to the surface and evenly distributes the weight of the solar panels to the roof structure. The integration of weatherproofing, mounting, and structural support components into the specialized profiles (i.e., the sealing profile, and the fixing profile) simplifies the installation procedure, saving time and effort.

Throughout the present disclosure, the term "mounting bracket system" as used herein refers to a framework or a structure used to securely attach solar panels to various surfaces, such as rooftops, facades or ground-mounted structures, in order to harness solar energy efficiently. Optionally, the mounting bracket system can be made up of various materials such as aluminum, steel, stainless steel, plastic/polymer, composite materials, galvanized steel and the like. Typically, components of the mounting bracket system may vary depending on factors such as type of installation, size and weight of the solar panels and specific requirements of the site. Notably, the mounting bracket system provides structural support to the solar panels, distributing the solar panels' weight evenly across the surface on which the solar panels are to be mounted, thus preventing damage or distortion of the solar panels. Throughout the present disclosure, the term "solar panels" refers to photovoltaic panels used to convert sunlight into electricity through the photovoltaic effect. Typically, the solar panels comprise multiple solar cells, which generate direct current (DC) electricity when exposed to the sunlight. Beneficially, the solar panels harness the solar energy and convert the solar energy into usable electricity to provide clean, renewable and sustainable energy for residential, commercial and industrial applications.

Throughout the present disclosure, the term "sealing profile" refers to a specific component designed to create a watertight seal when attached to the side of the solar panels. Typically, the sealing profile is made from durable and weather-resistant materials such as rubber, silicone, EPDM (ethylene propylene diene monomer), PVC (polyvinyl chloride) and the like. Notably, the sealing profile has a cross-sectional shape that facilitates the sealing profiles' function, ensuring effective weatherproofing and protection of the solar panels. Throughout the present disclosure, the term "side" refers to border region or flat edges of the solar panel where the sealing profile is intended to be attached. Moreover, the sealing profile can be attached to any of the four sides of the solar panel to create the watertight seal when the solar panels are joined together. The term "solar panel" refers to a single individual unit from amongst the solar panels. Moreover, attaching the sealing profile to the side of the solar panel is done using suitable adhesives, fastening mechanisms, interlocking mechanisms and the like. The sealing profile is strategically positioned to cover the edges or seams of the solar panel, creating a barrier against moisture, dust, and other environmental elements that may potentially compromise operability and performance of the solar panel. Throughout the present disclosure, the term "cross-section of the sealing profile" refers to an internal structure of the sealing profile that depicts how components are arranged inside the sealing profile. The cross-section of the sealing profile may include features such as ridges, grooves or flanges that enhance an ability of the sealing profile to create a tight seal when attached to the side of the solar panel.

Throughout the present disclosure, the term "sealing profile base" refers to a bottom portion of the sealing profile to provide a barrier against ingress of water, dust, air and other contaminants between two adjoining surfaces. Typically, the sealing profile base is made of a durable and weather-resistant material such as rubber, synthetic polymer and the like. Notably, the sealing profile base serves as primary contact between the sealing profile and the side of the solar panel to which the sealing profile is attached, ensuring a secure and effective sealing of the solar panel. Throughout the present disclosure, the term "first end" refers to an endpoint or extremity of the sealing profile base. Notably, the first end represents an initial point of reference when describing physical dimensions, orientation or positioning of the sealing profile base relative to other components or surfaces on the sealing profile. The term "second end" refers to an opposite endpoint or the extremity of the sealing profile base, relative to the first end. Typically, the first end is located at the opposite end from the first end. Moreover, the second end may serve as a reference point for measuring overall length, width and other dimensional attributes of the sealing profile base. It will be appreciated that while attaching the sealing profile to the side of the solar panel, the first end and the second end of the sealing profile base serve as reference points for alignment and positioning of the sealing profile with respect to the solar panel. The alignment is critical for achieving effective weather sealing and preventing water ingress, which could damage the solar panel or compromise the performance thereof.

Throughout the present disclosure, the term "upper part" refers to a segment or section of the sealing profile that is positioned parallel to the sealing profile base. Typically, the upper part includes elements such as attachment points, sealing mechanisms or structural reinforcements, depending on intended purpose of the upper part within the sealing profile. Throughout the present disclosure, the term "third end" refers to an endpoint or extremity of the upper part. Notably, the third end represents an initial point of reference when describing physical dimensions, orientation or positioning of the upper part relative to other components or surfaces on the sealing profile. Throughout the present disclosure, the term "fourth end" refers to an opposite endpoint or the extremity of the upper part, relative to the third end. Throughout the present disclosure, the term "first distance" refers to a distance between the sealing profile base and the upper part of the sealing profile. Typically, the first distance may be predetermined based on design requirements or engineering considerations, ensuring optimal performance and functionality of the sealing profile. Moreover, arrangement of the upper part at the first distance from the sealing profile base contributes to the overall effectiveness and stability of the sealing profile.

Optionally, at least one of the third end and the fourth end comprises a chamfered corner. In this regard, the term "chamfered corner" refers to specific type of edge or corners where two surfaces, of the third end or the fourth end or both of the third end and the fourth end of the upper part, meet at an angle that is not perpendicular, but is rather beveled or sloped. It will be appreciated that the "at least one of the third end and the fourth end" refers to "the third end" in some implementations, "the fourth end" in other implementations and "the third end and the fourth end" in yet other implementations. Typically, the chamfered corner creates a smooth transition between two intersecting surfaces, reducing risk of sharp edges of the third end and the fourth end of the upper part and improving aesthetics, safety, and functionality of the sealing profile. Notably, the chamfered corner is achieved through machining or cutting processes using specialized tools such as chamfer mills, chamfer planes, or chamfer routers to remove material from the third end and/or the fourth end of the upper part at a specific angle, creating the chamfered corner. A technical effect is that the chamfered corner reduces the risk of injuries caused by sharp edges in the third end and/or the fourth end of the upper part and thus enhancing the overall safety of the sealing profile. Beneficially, the chamfered corner can aid in the assembly process by ensuring smoother fits and reducing the likelihood of components catching or snagging during the installation of the solar panels.

Optionally, the upper part between the third end and the fourth end, is wider than the sealing profile base between the first end and the second end. Notably, the upper part between the third end and the fourth end, being wider than the sealing profile base between the first end and the second end may provide additional structural stability and support to the sealing profile. Moreover, the upper part between the third end and the fourth end being wider can enhance the sealing capabilities of the sealing profile by providing a large surface area for the sealing materials or gaskets to create a watertight seal. A technical effect is to provide a larger surface area for the sealing against the solar panel to which the sealing profile is attached, potentially reducing the risk of water infiltration, enhancing structural integrity, and improving sealing effectiveness, and the overall strength and stability of the sealing profile.

Throughout the present disclosure, the term "first dividing wall" refers to a structural component within the sealing profile for separating the upper part and the sealing profile base. Notably, the first dividing wall is arranged between the upper part and the sealing profile base in the sealing profile. Throughout the present disclosure, the term "first side" refers to a surface of the first dividing wall facing a particular direction. Throughout the present disclosure, the term "second side" refers to that surface of the first dividing wall that is opposite to the first side, and facing a direction that is opposite to the particular direction the first side is facing. Moreover, the first dividing wall act as a support structure, providing additional rigidity and strength to the sealing profile. The first dividing wall helps to compartmentalize different areas within the sealing profile, such as creating separate chambers for the sealing materials or reinforcing specific sections of the sealing profile.

Optionally, the first side is further covered with a layer of adhesive. In this regard, the term "layer of adhesive" refers to a thin coating of film of adhesive substance applied to the first side of the first dividing wall, of the sealing profile. Typically, the layer of adhesive serves the purpose of bonding the sealing profile to another surface or component of the solar panel to which the sealing profile is attached. Optionally, the adhesive may include silicone adhesive, polyurethane adhesives, acrylic adhesives, epoxy adhesive and the like. Moreover, the layer of adhesive is applied using methods such as spraying, brushing, rolling, or extrusion, depending on the viscosity and characteristics of the adhesive material. A technical effect of applying the layer of adhesive onto the first side of the sealing profile is that the ability of the sealing profile to attach to the side of the solar panel is significantly enhanced. Moreover, beneficially, the layer of adhesive prevents the ingress of moisture, dust, or other contaminants in the sealing profile.

Optionally, the second side is further covered with a seal. In this regard, the term "seal" refers to a material or a structure that is used to prevent passage of substances (such as liquids, gases and contaminants) through the second side of the first dividing wall. Typically, the second side is covered with the seal to protect against environmental factors and ensure proper functioning of the sealing profile and the mounting bracket system. Moreover, the seal serves to create a waterproof and weatherproof barrier between the sealing profile and the surface of the solar panel, to which the sealing profile is attached. A technical effect of the second side being covered with the seal is to provide waterproofing and weatherproofing capabilities to the sealing profile, thereby enhancing its ability to protect against moisture, dust, and other environmental elements.

Throughout the present disclosure, the term "first angle" refers to an angle at which the first dividing wall is connected to the sealing profile base between the first end and the second end. Notably, purpose of the first angle is to specify an alignment between the first dividing wall and the sealing profile base. The first angle ensures proper alignment and the structural integrity of the first dividing wall and the sealing profile base, when assembled. Optionally, the first dividing wall is connected to the sealing profile base at a center point between the first end and the second end. Notably, the first dividing wall is connected to the sealing profile base at the first angle using one of the known techniques such as bonding, welding, fastening and the like.

Throughout the present disclosure, the term "second angle" refers to the angle at which the first dividing wall is connected to the upper part of the sealing profile, between the third end and fourth end of the upper part. Optionally, the first dividing wall is connected to the upper part at a center point between the third end and the fourth end. Notably, the first dividing wall is connected to the upper part at the second angle, using one of the known techniques such as bonding, welding, fastening and the like. It will be appreciated that the second angle determines the orientation of the first dividing wall with respect to the upper part of the sealing profile affecting factors such as structural strength, sealing effectiveness, and ease of assembly. The second angle may be selected as such to enhance specific aspects of the sealing profile's functionality, such as ensuring a secure fit, or promoting efficient sealing.

Throughout the present disclosure, the term "fixing profile" refers to a structural component designed to securely attach or accommodate the corner of the solar panels within the mounting bracket system. Notably, the fixing profile plays a crucial role in providing stability, support and structural integrity to the solar panel. Typically, the fixing profile is made from durable and weather-resistant materials to withstand harsh outdoor conditions and provide long-term reliability. In this regard, common materials used for manufacturing the fixing profile include aluminum, steel, high-strength plastics and the like. Throughout the present disclosure, the term "corner" refers to a point where two edges or two sides of the solar panel meet at an angle. Typically, the solar panels are rectangular or square in shape, and each corner represents a junction point where two of the solar panel's edges intersect. Notably, the fixing profile is designed to accommodate the corner of the solar panel providing support and stability to the solar panel while ensuring that the solar panel is securely fastened to the surface. Moreover, the fixing profile is securely attached to the surface, such as a roof or a frame, using appropriate fasteners or mounting hardware. The attachment ensures that the solar panel remains stable and resistant to external forces such as wind or the weather. Throughout the present disclosure, the term "cross-section of the fixing profile" refers to an internal structure of the fixing profile that depicts how components are arranged inside the fixing profile.

Throughout the present disclosure, the term "U-shaped upper part" refers to a component of the fixing profile that is shaped like the letter U, to accommodate the corner or the edge of the solar panel, providing support to the corner of the solar panel. Throughout the present disclosure, the term "bottom part" refers to horizontal section of the U-shaped upper part of the fixing profile. Typically, the bottom part of the U-shaped upper part rests against the edge of the solar panel, to provide stability and support to the solar panel. Throughout the present disclosure, the term "first arm" refers to a vertical arm of the U-shaped upper part that extends downward from the bottom part. The first arm facilitates to enclose one side of the solar panel during the installation of the solar panel on the surface. Throughout the present disclosure, the term "second arm" refers to other vertical arm of the U-shaped upper part of the fixing profile that extends downward from the bottom part at the second distance from the first arm. Notably, length of the second arm of the U-shaped upper part is longer than the length of the first arm of the U-shaped upper part. Typically, the second arm helps to enclose the other side of the corner of the solar panel. Moreover, the bottom part connects the first arm and the second arm, forming the base of the U-shaped upper part. The first arm and the second arm extend vertically downward from the bottom part, completing the U-shaped upper part. Throughout the present disclosure, the term "second distance" refers to a distance between the first arm and the second arm of the U-shaped upper part of the fixing profile. Moreover, the U-shaped upper part is manufactured using materials such as aluminum, steel and the like, chosen for their durability, strength and resistance to corrosion. The U-shaped upper part is designed to be compatible with the specific dimensions and configuration of the solar panels intended for installation.

Optionally, the U-shaped upper part further comprises reinforced corners comprising slots arranged to guide out water. In this regard, the term "reinforced corners" refers to strengthened or fortified areas at corners of the U-shaped upper part of the fixing profile. Notably, the reinforced corner lies between the first arm and the bottom part, and between the second arm and the bottom part, respectively. Typically, the reinforced corners are designed to withstand pressure, stress and impact, better than the surrounding area. The reinforced corners provide extra support and resistance against potential damage or wear and tear in the U-shaped upper part. Throughout the present disclosure, the term "slots" refers to openings or channels that are incorporated on the reinforced corners in the U-shaped upper part to act as passages for guiding out the water. Notably, the slots serve a specific function of guiding water out of the mounting bracket system, preventing water accumulation or pooling, which could lead to corrosion, mold growth or other forms of damage to the solar panels. The purpose of the reinforced corners and adding slots is to improve the performance and longevity of the mounting bracket system. Moreover, the reinforced corners are typically achieved by using thicker or additional material or by employing specific reinforcement techniques. The slots are strategically positioned within the reinforced corners to allow water to drain away from the mounting bracket system effectively. The slots may be angled or designed to facilitate the smooth flow of water, minimizing the risk of water ingress and ensuring the integrity of the mounting bracket system. A technical effect is that the U-shaped upper part of the fixing profile becomes more robust and resilient to the risk of water ingress and thus, withstand environmental factors such as heavy rainfall or moisture exposure, reducing the likelihood of structural damage or deterioration over time.

Throughout the present disclosure, the term "reinforcement wall" refers to a vertical or inclined structural component within the fixing profile that is designed to provide additional strength, support and stability to the mounting bracket system. Optionally, the reinforcement wall is designed in such a way to remain hidden under the solar panel to which the fixing profile is attached and also to secure/store cables and plugs in a safe place. Moreover, the reinforcement wall is connected to the second arm of the U-shaped upper part of the fixing profile and extends vertically or diagonally to provide reinforcement. The reinforcement wall helps to distribute load more evenly across the structure of the fixing profile, reducing the risk of deformation or bending in the fixing profile, especially under external forces such as wind, snow or seismic activity. Throughout the present disclosure, the term "third angle" refers to that angle at which the reinforcement wall is connected to the second arm of the U-shaped upper part. The third angle determines orientation of the reinforcement wall with respect to the second arm.

Throughout the present disclosure, the term "second dividing wall" refers to a structural element or a wall which creates a division or separation between the U-shaped upper part and the fixing profile base of the fixing profile. Notably, the second dividing wall is connected to the second arm of the U-shaped upper part at one end and to the fixing profile base at the other end. The term "fourth angle" refers to the angle at which the second dividing wall is connected to the second arm of the U-shaped upper part of the fixing profile. Moreover, the second dividing wall helps to maintain the structural integrity and stability of the mounting bracket system by providing additional support and reinforcement. The second dividing wall is connected to the second arm of the U-shaped upper part at the fourth angle, ensuring secure attachment and proper alignment. Furthermore, the second dividing wall serves to channel or redirect water away from critical components, helping to prevent water damage and corrosion in the fixing profile.

Optionally, the second arm further comprises an elevated element on an opposite side from the reinforcement wall and the second dividing wall. In this regard, the term "elevated element" refers to a raised or a higher section within the second arm of the U-shaped upper part of the fixing profile. Typically, the elevated element protrudes vertically or horizontally from the second arm of the U-shaped upper part of the fixing profile. The elevated element is positioned on the side of the second arm opposite to the reinforcement wall and the second dividing wall. Notably, the elevated element creates an effect of always pushing up the solar panel after being installed. The elevated element also prevents the water discharged by the reinforced corners of U-shaped upper part, from flowing back should this happen under the influence of winds or other weather conditions. A technical effect of the second arm comprising the elevated element is that the water discharged by the reinforced corners of U-shaped upper part, is effectively prevented from flowing back.

Optionally, the second dividing wall is covered with a layer of adhesive on an outer side. In this regard, the term "outer side" refers to external surface or exterior facing surface of the second dividing wall, where the frame of the solar panel can be attached. Notably, a coating or a film of adhesive material such as glue is applied to surface of the outer side of the second dividing wall. The application of the layer of adhesive on the outer side of the second dividing wall facilitates the bonding or attachment of the solar panel to the fixing profile. A technical effect of covering the outer side of the second dividing wall with the layer of adhesive is that the fixing profile is effectively attached to fixing profile with improved bonding and sealing capabilities.

Optionally, the mounting bracket system further comprises a reinforcement corner between at least one of:
  the sealing profile base and the first dividing wall;
  the upper part and the first dividing wall;
  the second arm and the second dividing wall;
  the fixing profile base and the second dividing wall.

In this regard, the term "reinforcement corner" refers to a specialized corner positioned at a specific junction of two elements within the mounting bracket system. The reinforcement corner is the corner against which the solar panel is pressed while being attached to the fixing profile. Moreover, the reinforcement corner determines the correct position of the solar panel relative to the depth of the fixing profile. The reinforcement corners are located at the specific junctions within the mounting bracket system such as between the sealing profile base and the first dividing wall, and/or the U-shaped upper part and the first dividing wall, and/or the second arm and the second dividing wall and/or the fixing profile base and the second dividing wall. The reinforcement corner enables to prevent structural weaknesses or failures due to bending, twisting or other types of mechanical stress and by providing additional support and rigidity to the mounting bracket system. The reinforcement corner helps to maintain the integrity and stability of the mounting bracket system, particularly under load or environmental conditions. It may be appreciated that the reinforcement corner is typically designed as a solid or reinforced section integrated into the structure of the mounting bracket system. A technical effect of the method further comprising the reinforcement corner is to strengthen critical junctions, reducing the risk of failure or damage during installation, operation, or adverse environmental conditions.

Throughout the present disclosure, the term "fixing profile base" refers to the bottom section or base section of the fixing profile. Notably, the fixing profile base ensures strength and structural integrity of the fixing profile. Typically, the fixing profile base consists of a flat or slightly curved surface with predefined attachment points or channels for securing the mounting bracket system to the underlying substrate, such as a roof, rafter, or support structure. The primary function of the fixing profile base is to provide a stable and secure foundation for the solar panel installation, which facilitates the proper alignment, positioning, and attachment of the mounting brackets to the substrate, ensuring that the solar panel is securely anchored in place. Moreover, the fixing profile base is typically constructed from durable and weather-resistant materials, such as aluminum, steel, or composite materials, chosen for their strength, corrosion resistance, and longevity. The fixing profile base comprises a variety of design elements, such as reinforced ribs, grooves, or flanges, to enhance its structural integrity and load-bearing capacity. Throughout the present disclosure, the term "fifth end" refers to an extreme end of the fixing profile base. Throughout the present disclosure, the term "sixth end" refers to other extreme end of the fixing profile base. Typically, the sixth end is located opposite to the fifth end of the fixing profile base. Notably, the fifth end and the sixth end serves as a reference point or boundary for the fixing profile base. The term "fifth angle" refers to the angle at which the fixing profile base is connected to the reinforcement wall. The term "sixth angle" refers to the angle at which the fixing profile base is connected to the second dividing wall. Typically, the connection is vital for maintaining alignment, rigidity and overall functionality of the mounting bracket system.

Optionally, the fixing profile base further comprises at least two leg elements configured to support the fixing profile base. Throughout the present disclosure, the term "leg elements" refers to distance legs that are integrated into or attached to the fixing profile base to support the fixing profile base. Notably, inclusion of the at least two leg elements serves the purpose of providing structural support to the fixing profile base. The at least two leg elements help distribute various loads evenly and support the stability of the mounting bracket system. The at least two leg elements rest on the structure on which the solar panel is to be installed and provide the appropriate angle for the installation of the mounting bracket system, so that the solar panel is directly relative to the fixing profile. A technical effect is that the unevenness of the structure does not affect the installation of the solar panels on the structure and make sure that the solar panels are parallel to the fixing profile and surface of the roof. Beneficially, the at least two leg elements elevate the fixing profile base above the surface on which the fixing profile is mounted, which is crucial for ensuring proper drainage and preventing water accumulation, especially in outdoor installations.

Throughout the present disclosure, the term "gap" refers to a space or an opening that exists between the fixing profile base, the reinforcement wall and the second dividing wall within the mounting bracket system. Typically, the gap allows for flexibility and adjustability within the mounting bracket system, accommodating variations in the alignment and configuration of the fixing profile base, the reinforcement wall and the second dividing wall. The gap enables drainage and ventilation, preventing the accumulation of moisture and debris that could potentially compromise the integrity and performance of the mounting bracket system. Throughout the present disclosure, the term "third distance" refers to distance between the fixing profile base and the second arm of the U-shaped upper part of the fixing profile. Notably, determining and maintaining the third distance between the fixing profile base and the second arm of the U-shaped upper part of fixing profile is crucial for the structural integrity and functionality of the mounting bracket system.

Optionally, the gap further comprises a tube arranged to guide the solar panels on a same line. Throughout the present disclosure, the term "tube" refers to a cylindrical or square structure or a conduit integrated into the gap to facilitate the alignment of the solar panels on the same line or plane. Optionally, the tube is cylindrical or square in shape, with a hollow interior that allows for the passage of wires, cables, or other components necessary for the solar panel installation. Notably, guiding the solar panels on the same line enables to create an array of solar panels installed on the surface (such as the roof tops). A technical effect is that the solar panels are effectively guided on the same line via the tube in the gap.

Optionally, at least one of the first distance, the second distance and the third distance is selected from a range of 10 mm up to 50 mm. In this regard, the at least one of the first distance, the second distance and the third distance is selected from the range of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 mm up to 25, 26, 27, 28, 29, 30, 31, 32, 33, 34, 35, 36, 37, 38, 39, 40, 41, 42, 43, 44, 45, 46, 47, 48, 49, 50 mm. A technical effect is that the sealing profile and the fixing profile are designed to be compact in size by selecting the at least one of the first distance, the second distance and the third distance from the range of 10 mm up to 50 mm.

Optionally, the fixing profile base is wider between the fifth end and the sixth end, than the second arm of the U-shaped upper part. In this regard, the fixing profile base being wider between the fifth end and the sixth end, than the second arm of the U-shaped upper part implies that an elongated length of the fixing profile base between the fifth end and the sixth end is greater than an elongated length of the U-shaped upper part. A technical effect of the fixing profile base being wider between the fifth end and the sixth end, than the second arm of the U-shaped upper part is that a mechanical stability of the fixing profile is improved.

Optionally, at least one of the first angle, the second angle, the third angle, the fourth angle is selected from a range of 80° up to 100° degrees. In this regard, the at least one of the first angle, the second angle and the third angle is selected from the range of 80°, 84°, 88°, 92°, 96° up to 84°, 88°, 92°, 96°, 100°. A technical effect is that the solar panels could be adjusted to align with changes in geometric profile.

Optionally, at least one of the first angle, the second angle, the third angle, the fourth angle is selected to be 90° degrees. In this regard, the at least one of the first angle, the second angle, the third angle, the fourth angle being selected to be 90° improves an alignment of the sealing profile and the fixing profile. A technical effect is that a mechanical and structural stability of the sealing profile and the fixing profile.

Optionally, the fixing profile base further comprises attachment means configured to attach the fixing profile to form a roof. In this regard, the term "roof" refers to an artificial surface that is formed from a top portion of the solar panel exposed to sunlight, by attaching the solar panel to a ground surface in an array. Subsequently, the solar panel is attached to the ground surface by attaching the fixing profile of the solar panel to the ground surface. Throughout the present disclosure, the term "attachment means" refers to any form of means that attaches the fixing profile of the solar panel to the ground surface. Optionally, the attachment means is one of screws, fasteners, bolts, and the like. A technical effect is that the fixing profile is effectively attached to form the roof.

Optionally, at least one of: the sealing profile, the fixing profile comprises material selected from at least one of: aluminium alloys, stainless steel alloys, polymer alloys, composite materials. In this regard, the at least one of: the aluminium alloys, the stainless steel alloys, the polymer alloys, the composite materials is durable and water-resistant which enhances a longevity and operability of at least one of: the sealing profile, the fixing profile. A technical effect is that suitable material is selected from at least one of: the aluminium alloys, the stainless steel alloys, the polymer alloys, the composite materials to effectively enhance the longevity and operability of the at least one of: the sealing profile, the fixing profile.

The present disclosure also relates to the solar panel as described above. Various embodiments and variants disclosed above, with respect to the aforementioned mounting bracket system, apply mutatis mutandis to the solar panel.

Optionally, the solar panel is at least attached to the first side with an adhesive and supported by the bottom part.

The present disclosure also relates to the use of the solar panel as described above. Various embodiments and variants disclosed above, with respect to the aforementioned mounting bracket system and the aforementioned solar panel, apply mutatis mutandis to the use of the solar panel.

The term "surface" refers to a roof or a façade formed due to combination of the solar panel with the mounting bracket system. Moreover, the mounting bracket system is securely affixed to the designated surface, such as a roof or wall, using suitable mounting techniques and hardware. Once installed, the solar panels along with the mounting bracket system, collectively form the surface capable of capturing sunlight and converting it into electricity. A technical effect of creating the surface using the solar panel and the mounting bracket system, is to facilitate a solution that does not require classic roofing materials such as asbestos cement, stone, sheet metal, shingle and the like. Moreover, the surface serves the purpose of harnessing the solar energy for electricity generation. Furthermore, utilization of the solar panel and the mounting bracket system to form the surface contributes to the widespread adoption of solar energy systems, promoting sustainability and reducing dependence on traditional fossil fuels.

DETAILED DESCRIPTION OF THE DRAWINGS

Figure 1B:
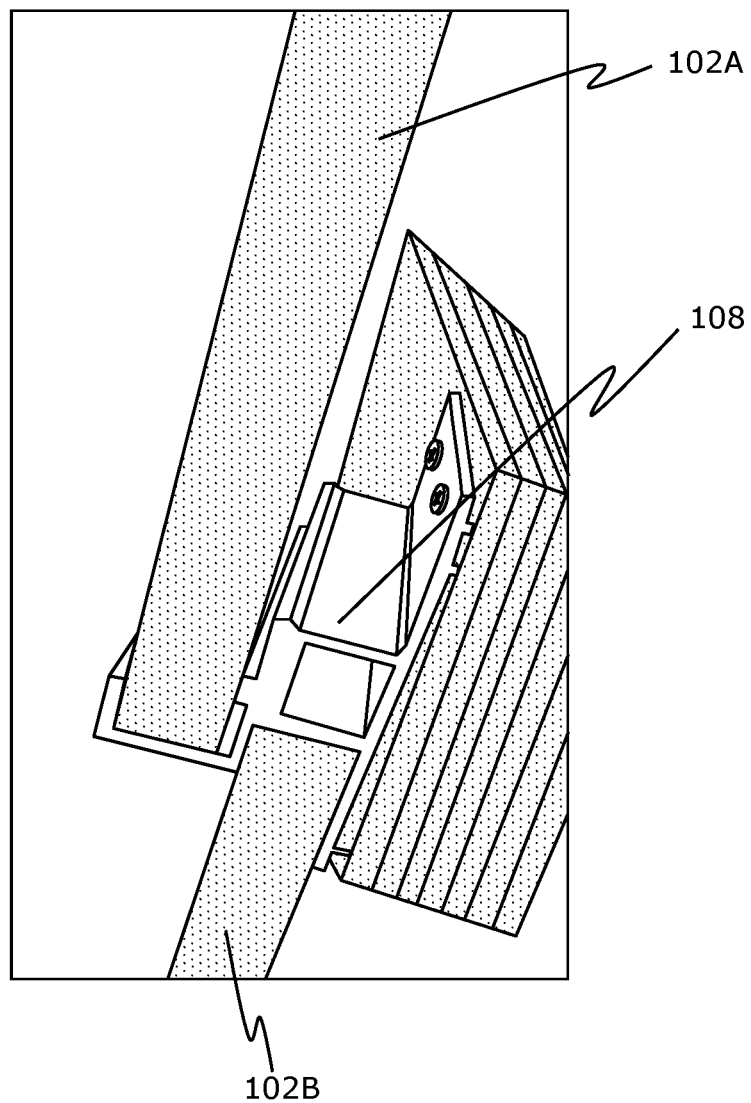

Referring to FIGS. 1A and 1B, collectively, illustrated are schematic illustrations of a top view and a side view of a mounting bracket system 100 for solar panels 102A-C, respectively, in accordance with an embodiment of the present disclosure. As shown, the mounting bracket system 100 comprises a sealing profile 104 attached to a side 106 of a solar panel 102A. Moreover, the mounting bracket system 100 comprises a fixing profile 108 to accommodate a corner 110 of the solar panel 110.

Figure 2:
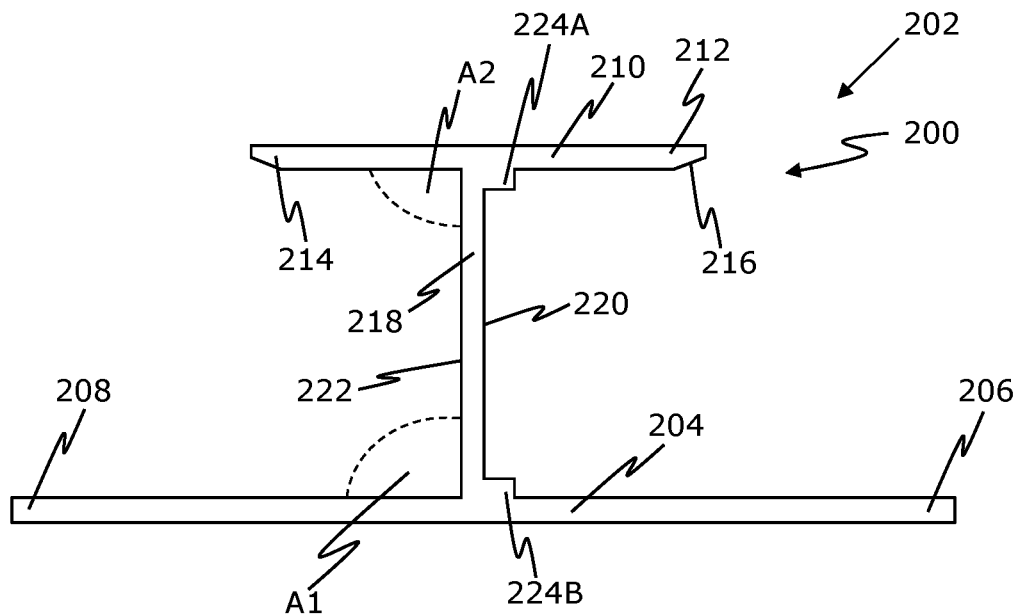
FIG. 2 is a schematic illustration of a cross-section of a sealing profile, in accordance with an embodiment of the present disclosure.

Referring to FIG. 2, illustrated is a schematic illustration of a cross-section 200 of a sealing profile 202, in accordance with an embodiment of the present disclosure. As shown, the cross-section 200 sealing profile 202 comprises a sealing profile base 204 having a first end 206 and a second end 208. Moreover, the cross-section 200 of the sealing profile 202 comprises an upper part 210 having a third end 212 and a fourth end 214, the upper part 210 arranged at a first distance from the sealing profile base 204. Optionally, at least one of the third end 212 and the fourth end 214 comprises a chamfered corner 216. Furthermore, the cross-section 200 of the sealing profile 202 comprises a first dividing wall 218 having a first side 220 and a second side 222, the first dividing wall 218 connected to the sealing profile base 204 between the first end 206 and the second end 208 at a first angle A1, and the first dividing wall 218 connected to the upper part 210 between the third end 212 and the fourth end 214 at a second angle A2. Optionally, a reinforcement corner 224A-B is present between at least one of: the sealing profile base 204 and the first dividing wall 218, the upper part 210 and the first dividing wall 218.

Figure 3:
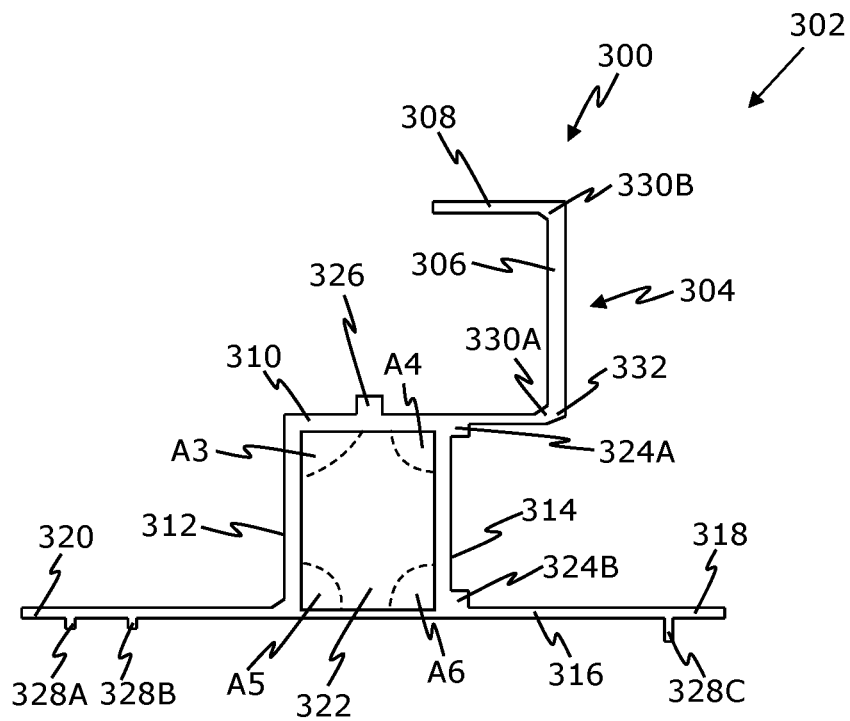
FIG. 3 is a schematic illustration of a cross-section of a fixing profile, in accordance with an embodiment of the present disclosure.

Referring to FIG. 3, illustrated is a schematic illustration of a cross-section 300 of a fixing profile 302, in accordance with an embodiment of the present disclosure. As shown the cross-section 300 of the fixing profile 302 comprises a U-shaped upper part 304 having a bottom part 306, a first arm 308 and a second arm 310 at a second distance from the first arm 308. Moreover, the cross-section 300 of the fixing profile 302 comprises a reinforcement wall 312 connected to the second arm 310 at a third angle A3. Furthermore, the cross-section 300 of the fixing profile 302 comprises a second dividing wall 314 connected to the second arm 310 at a fourth angle A4. Furthermore, the cross-section 300 of the fixing profile 302 comprises a fixing profile base 316 having a fifth end 318 and a sixth end 320, the fixing profile base 316 being connected to the reinforcement wall 312 at a fifth angle A5, and the fixing profile base 316 being connected to the second dividing wall 314 at a sixth angle A6, wherein a gap 322 is formed between the reinforcement wall 312, the second dividing wall 314 and the fixing profile base 316, and wherein the fixing profile base 316 is at a third distance from the second arm 310. Optionally, a reinforcement corner 324A-B is present between at least one of: the second arm 310 and the second dividing wall 314, the fixing profile base 316 and the second dividing wall 314. Optionally, the second arm 310 further comprises an elevated element 326 on an opposite side from the reinforcement wall 312 and the second dividing wall 314. Optionally, the fixing profile base 316 further comprises at least two leg elements 328A-C configured to support the fixing profile base 316. Optionally, the U-shaped upper part 304 further comprises reinforced corners 330A-B comprising slots 332 arranged to guide out water.

Figure 4A:
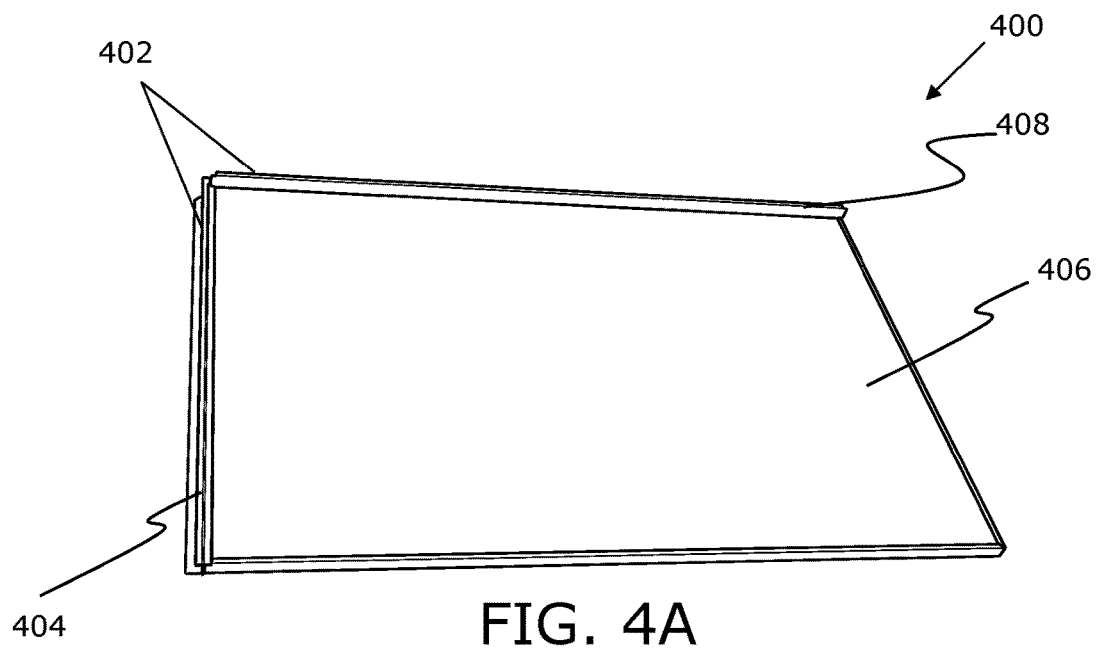
FIGS. 4A and 4B are schematic illustrations of solar panel comprising a mounting bracket system, in accordance with an embodiment of the present disclosure.

Referring to FIG. 4A, illustrated is a schematic illustration of a solar panel 400, in accordance with an embodiment of the present disclosure. As shown, the solar panel 400 comprises a mounting bracket system 402 comprising a sealing profile 404 attached to a side of a solar panel 406 and a fixing profile 408 attached to an upper or lower side of the solar panel 406.

Figure 4B:
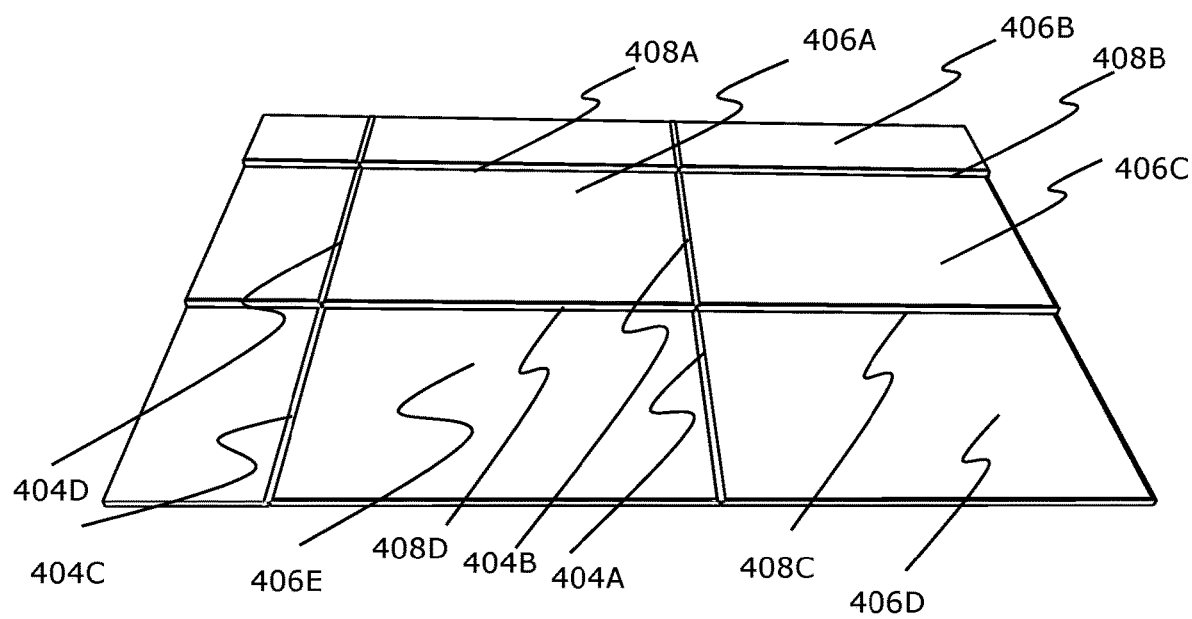

Referring to FIG. 4B, illustrated is a schematic illustration of solar panels 406A, 406B, 406C, 406D, 406E comprising a mounting bracket system, which comprises sealing profiles 404A, 404B, 404C, 404D attached to sides of solar panels 406A, 406B, 406C, 406D, 406E and fixing profiles 408A, 408B, 408C, 408D attached to an upper or lower sides of solar panels 406A, 406B, 406C, 406D, 406E.

Figure 4C:
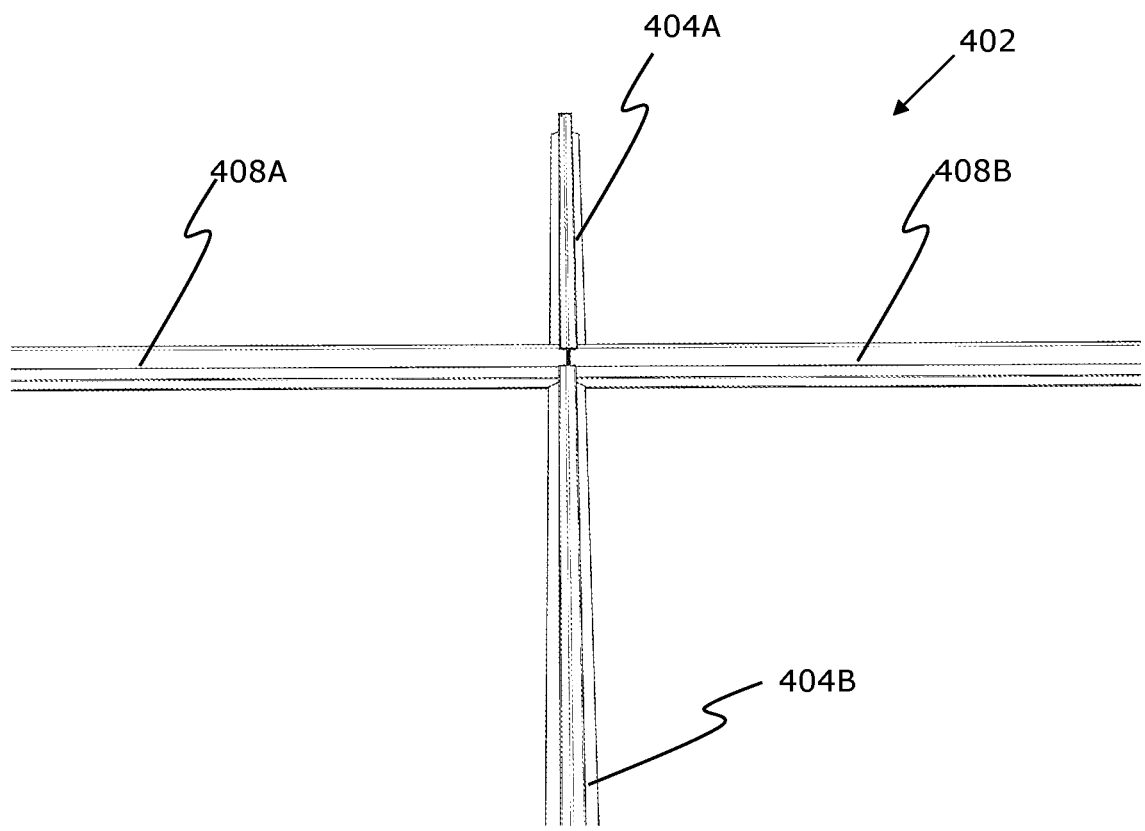
FIGS. 4C and 4D are schematic illustrations of a mounting bracket system without a solar panel, in accordance with an embodiment of the present disclosure.
Figure 4D:
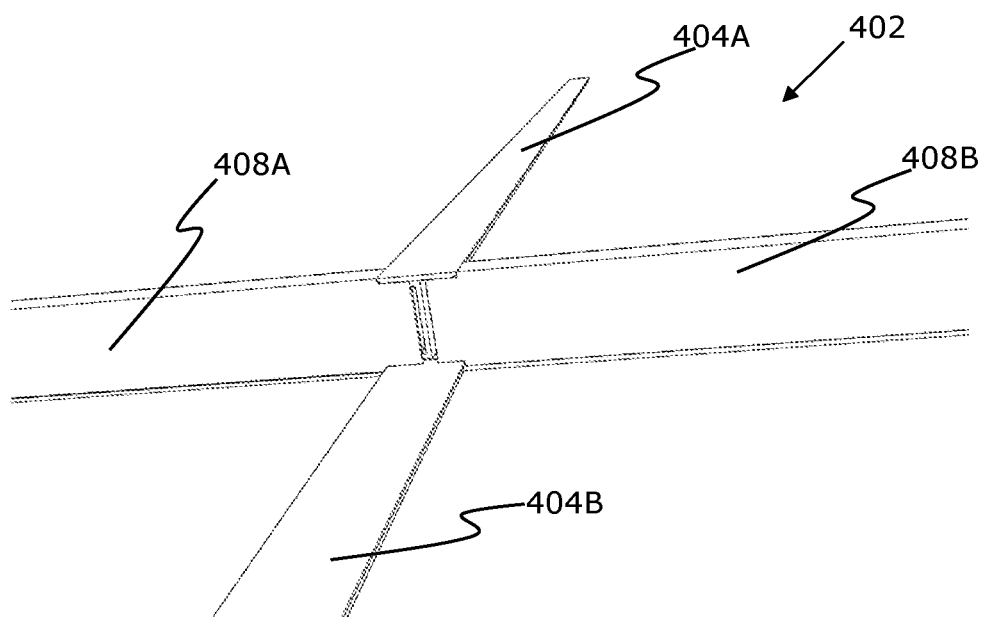

Referring to FIG. 4C, illustrated is a schematic illustration of mounting bracket system 402 without solar panels and referring to FIG. 4D, illustrated is a schematic illustration of a perspective view of a mounting bracket system 402 without solar panels. The mounting bracket system 402 comprises sealing profiles 404A, 404B and fixing profiles 408A, 408B.

Figure 5A:
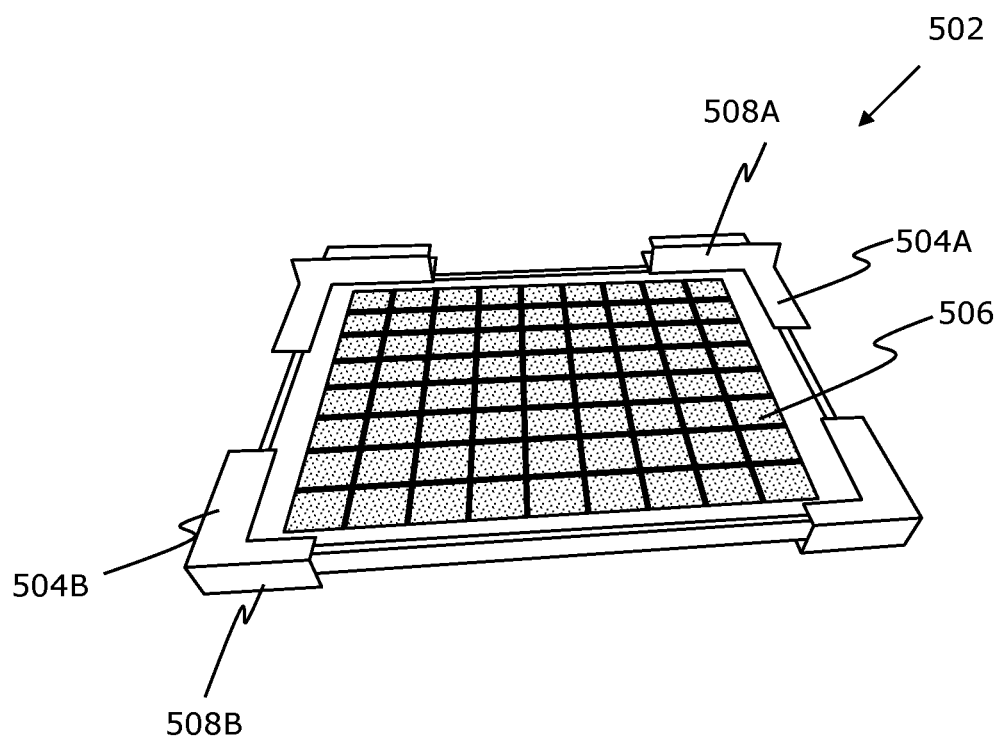
FIGS. 5A and 5B collectively are schematic illustrations of an embodiment of the present disclosure comprising mounting bracket systems and solar panels.

Referring to FIG. 5A, illustrated is a schematic illustration of a mounting bracket system 502 attached to a solar panel 506, in accordance with an embodiment of the present disclosure. As shown, the solar panel 506 comprises sealing profiles 504A, 504B and fixing profiles 508A, 508B.

Figure 5B:
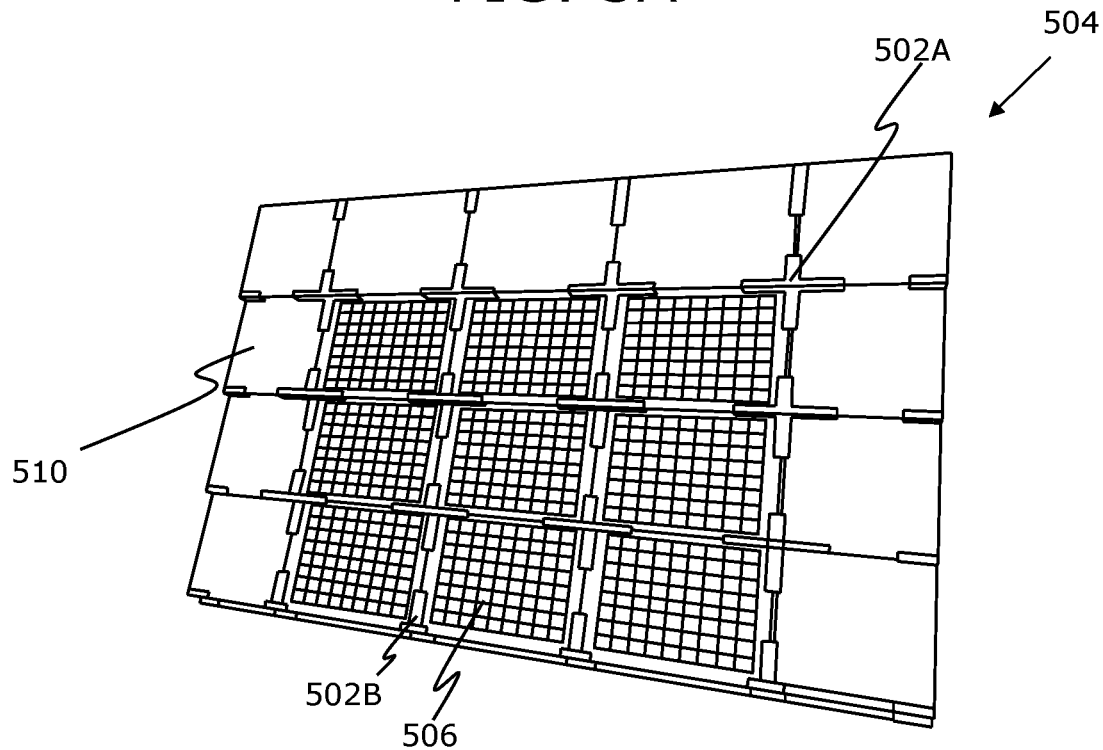

Referring to FIG. 5B, collectively, illustrated are schematic illustrations of a front view and a side view of use of a solar panel 506 together with a mounting bracket system 502A, 502B, in accordance with an embodiment of the present disclosure. As shown, the use of a solar panel 506 together with a mounting bracket system 502A, 502B forms a surface 504 comprising solar panels, mounting bracket systems and roof tiles 510.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A mounting bracket system for solar panels, the mounting bracket system comprising:
   a sealing profile configured to be attached to a side of a solar panel, wherein a cross-section of the sealing profile comprises:
      a sealing profile base having a first end and a second end,
      an upper part having a third end and a fourth end, the upper part arranged at a first distance from the sealing profile base, and
      a first dividing wall having a first side and a second side, the first dividing wall connected to the sealing profile base between the first end and the second end at a first angle A1, and the first dividing wall connected to the upper part between the third end and the fourth end at a second angle A2; and
   a fixing profile configured to accommodate a corner of the solar panel, wherein a cross-section of the fixing profile comprises:
      a U-shaped upper part having a bottom part, a first arm and a second arm at a second distance from the first arm,
      a reinforcement wall connected to the second arm at a third angle A3,
      a second dividing wall connected to the second arm at a fourth angle A4, and
      a fixing profile base having a fifth end and a sixth end, the fixing profile base being connected to the reinforcement wall at a fifth angle A5, and the fixing profile base being connected to the second dividing wall at a sixth angle A6, wherein a gap is formed between the reinforcement wall, the second dividing wall and the fixing profile base, and wherein the fixing profile base is at a third distance from the second arm.

2. The mounting bracket system according to claim 1, wherein at least one of the third end and the fourth end comprises a chamfered corner.

3. The mounting bracket system according to claim 1, further comprising a reinforcement corner between at least one of:
the sealing profile base and the first dividing wall;
the upper part and the first dividing wall;
the second arm and the second dividing wall;
the fixing profile base and the second dividing wall.

4. The mounting bracket system according to claim 1, wherein the first side is further covered with a layer of adhesive.

5. The mounting bracket system according to claim 1, wherein the second side is further covered with a seal.

6. The mounting bracket system according to claim 1, wherein the second arm further comprises an elevated element on an opposite side from the reinforcement wall and the second dividing wall.

7. The mounting bracket system according to claim 1, wherein the second dividing wall is covered with a layer of adhesive on an outer side.

8. The mounting bracket system according to claim 1, wherein the fixing profile base further comprises at least two leg elements configured to support the fixing profile base.

9. The mounting bracket system according to claim 1, wherein the gap further comprises a tube arranged to guide the solar panels on a same line.

10. The mounting bracket system according to claim 1, wherein the U-shaped upper part further comprises reinforced corners comprising slots arranged to guide out water.

11. The mounting bracket system according to claim 1, wherein at least one of the first distance, the second distance and the third distance is selected from 10 mm up to 50 mm.

12. The mounting bracket system according to claim 1, wherein the upper part between the third end and the fourth end, is wider than the sealing profile base between the first end and the second end.

13. The mounting bracket system according to claim 1, wherein the fixing profile base between the fifth end and the sixth end, is wider than the second arm of the U-shaped upper part.

14. The mounting bracket system according to claim 1, wherein at least one of the angles selected from the first angle A1, the second angle A2, the third angle A3, and the fourth angle A4 is from 80° up to 100° degrees.

15. The mounting bracket system according to claim 1, wherein at least one of the first angle A1, the second angle A2, the third angle A3, and the fourth angle A4 is selected to be 90° degrees.

16. The mounting bracket system according to claim 1, wherein the fixing profile base further comprises attachment means configured to attach the fixing profile to form a roof.

17. The mounting bracket system according to claim 1, wherein at least one of the sealing profile and the fixing profile comprises material selected from at least one of: aluminium alloys, stainless steel alloys, polymer alloys and composite materials.

18. A solar panel comprising the mounting bracket system according to claim 1.

19. The solar panel according to claim 18, wherein the solar panel is at least attached to the first side with an adhesive and supported by the bottom part.

* * * * *